(12) United States Patent
Guyon et al.

(10) Patent No.: US 10,461,676 B2
(45) Date of Patent: Oct. 29, 2019

(54) METHOD FOR DETECTING STALLING OF AN ELECTRIC STEPPER MOTOR, AN ELECTRIC STEPPER MOTOR AND A HEATING, VENTILATION AND/OR AIR CONDITIONING SYSTEM WITH AN ELECTRIC STEPPER MOTOR

(71) Applicant: VALEO KLIMASYSTEME GMBH, Bad Rodach (DE)

(72) Inventors: Philippe Guyon, Creteil (FR); Daniel Garcia, Creteil (FR); Ralf Jahnig, Bad Rodach (DE); Markus Luig, Bad Rodach (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 0 days.

(21) Appl. No.: 15/685,471

(22) Filed: Aug. 24, 2017

(65) Prior Publication Data

US 2018/0062550 A1 Mar. 1, 2018

(30) Foreign Application Priority Data

Aug. 30, 2016 (EP) .................................... 16186368

(51) Int. Cl.
*H02P 8/34* (2006.01)
*H02H 7/085* (2006.01)
(Continued)

(52) U.S. Cl.
CPC ............ *H02P 8/34* (2013.01); *G05B 19/4062* (2013.01); *H02H 7/0851* (2013.01); *H02P 8/38* (2013.01);
(Continued)

(58) Field of Classification Search
CPC ..... H02P 8/34; H02P 8/38; H02P 8/12; G01R 1/00; G01R 23/00; G05B 1/00; G05B 19/40; H02H 7/0851
(Continued)

(56) References Cited

U.S. PATENT DOCUMENTS

2005/0116678 A1* 6/2005 Yamada ................... G01R 7/06
318/685
2011/0181229 A1* 7/2011 Galic ........................ H02P 8/38
318/696
(Continued)

FOREIGN PATENT DOCUMENTS

GB 2290178 A 12/1995

OTHER PUBLICATIONS

The European Search Report and Search Opinion in corresponding Euopean Application No. 16186368.3, dated Feb. 8, 2017 (6 pages).

*Primary Examiner* — Eduardo Colon Santana
*Assistant Examiner* — Devon A Joseph
(74) *Attorney, Agent, or Firm* — Osha Liang LLP

(57) ABSTRACT

A Method for detecting stalling of an electric stepper motor (18), with the following steps is shown:
a) samples of the voltage at a coil of the stepper motor (18) are taken continuously or in regular intervals,
b) a deviation value is determined corresponding to the deviation between the measured voltages of the two samples, and
c) the deviation value is used to determine whether the electric motor (18) is stalling.
Further, a stepper motor and a heating, ventilation and/or air conditioning system is shown.

15 Claims, 4 Drawing Sheets

Figure 1:
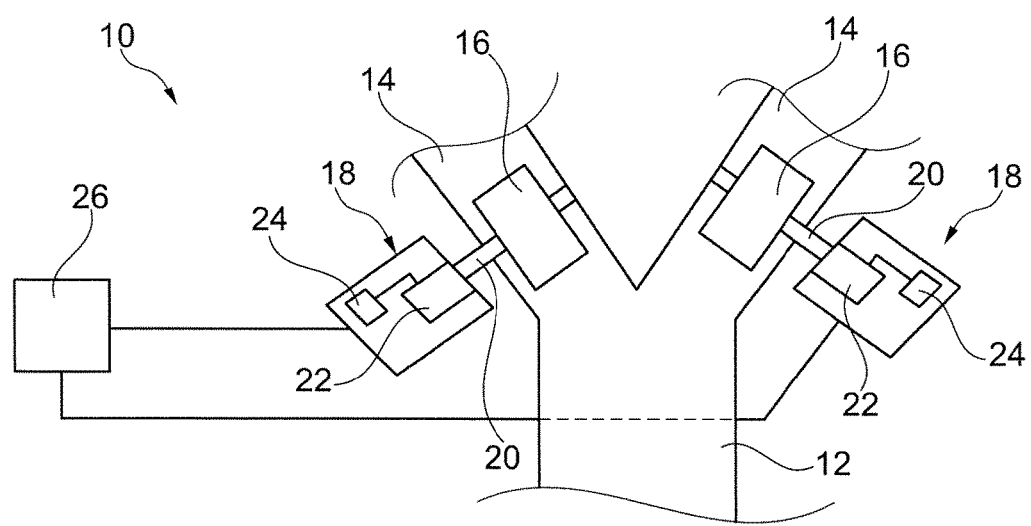

(51) Int. Cl.
    *H02P 8/38*         (2006.01)
    *G05B 19/4062*    (2006.01)
    *G05B 19/40*      (2006.01)
    *H02P 8/12*         (2006.01)

(52) U.S. Cl.
    CPC .... *G05B 19/40* (2013.01); *G05B 2219/42325* (2013.01); *H02P 8/12* (2013.01)

(58) Field of Classification Search
    USPC ........................................................ 318/685
    See application file for complete search history.

(56) References Cited

U.S. PATENT DOCUMENTS

| | | | | |
|---|---|---|---|---|
| 2012/0304914 A1* | 12/2012 | Russ | ................ | H02P 8/22 |
| | | | | 116/201 |
| 2016/0013743 A1* | 1/2016 | Braat | ................ | H02P 8/22 |
| | | | | 318/696 |

* cited by examiner

METHOD FOR DETECTING STALLING OF AN ELECTRIC STEPPER MOTOR, AN ELECTRIC STEPPER MOTOR AND A HEATING, VENTILATION AND/OR AIR CONDITIONING SYSTEM WITH AN ELECTRIC STEPPER MOTOR

The invention concerns a method for detecting stalling of an electric stepper motor, an electric stepper motor and a heating, ventilation and/or air conditioning system.

In heating, ventilation and/or air conditioning systems (HVAC systems) for a vehicle flaps are used to control and guide an air stream through the HVAC system or into the passenger cabin. In modern HVAC systems, the flaps are actuated by electric stepper motors to increase the passengers' comfort. For the correct operation of the HVAC system, the controller of the HVAC system needs information about the movement ranges of the flaps, i.e. the controller has to determine the end positions of the flaps in either direction. To detect the end position of the movement of the flaps, a control unit of the stepper motor detects whether the stepper motor itself is stalling, regards the first occurrence of stalling as the end position and transmits this information to the controller of the HCAV system.

In common stepper motors, the detection whether or not a stepper motor is stalling, is based on a measurement of the current fed to the coils of the stepper motor. By using the measured current, the control unit can detect, if the load of the stepper motor rises and regards a rise of the current or the load as evidence of a stalled stepper motor.

Further, known methods for determining a stall position are imprecise as normal changes in the load of the stepper motor are regarded as stalling of a stepper even though the stepper motor has not reached its end position. The load of the stepper motor rises, for example, due to dirt particles in the movement path of the flap. A rise of load also occurs when a stepper motor is beginning to actuate a second flap while still moving a first flap. In both situations, known methods are prone to false detections of stalling that can lead to a loss in functionality of the HVAC system.

It is therefore the object of the invention to provide a method for detecting the stalling of an electric stepper motor, an electric stepper motor and an HVAC system that allow simple, reliable and cost-efficient stalling detection.

For this purpose, a method for detecting stalling of an electric stepper motor is provided with the following steps:
a) samples of the voltage at a coil of the stepper motor are taken continuously or in a regular intervals,
b) a deviation value is determined corresponding to the deviation between the measured voltages of the two samples, and
c) the deviation value is used to determine whether the electric motor is stalling.

The deviation value is, for example, the difference or the ratio of the measured voltages of the two samples, and the method steps can be performed by a control unit of the stepper motor. By using the voltage at a coil of the stepper motor, a simple to measure but reliable value corresponding to the load of the stepper motor can be obtained. Further, the use of the deviation value between two samples allows for robust and reliable evaluation and detection whether or not the stepper motor is stalling.

In one embodiment of the invention, a start sample is taken at the beginning of a control phase corresponding to one step of the stepper motor, and an end sample is taken at the end of the control phase, wherein a deviation value is determined using the start sample and the end sample.

For example, the start sample is the second sample taken in a control phase and the end sample is the last sample in the same control phase. If 16 or 32 samples are taken per control phase, the end sample is the $16^{th}$ or the $32^{nd}$ sample of the control phase, respectively. By comparing the voltages at the beginning and at the end of a control phase, the method for detecting stalling is not influenced or disturbed by small rises in the load of the stepper motor. Thus, minor rises in the load of the stepper motor that occur, for example, if the flap cannot move freely because of defects or dirt or if the stepper motor has to move a second flap additionally to its first flap, do not cause a false detection of a stalled motor.

Preferably, the deviation value is the ratio between the voltage of the start sample and the voltage of the end sample. This way, the method is equally suited for high and low voltage ranges. For example, the deviation value can be the voltage of the start sample divided by the voltage of the end sample.

For instance, the deviation value is compared to at least one threshold. If the deviation value exceeds the threshold or one of the thresholds, stalling of the stepper motor is detected, providing a simple and adjustable method.

For example, stalling is detected if the deviation value is smaller than a lower threshold or larger than an upper threshold. The lower threshold can be 1.5 and the upper threshold can be 2.7. This way, small variations of the deviation value do not disturb the measurement as long as they remain within the allowed range. However, significant deviations to either side of the normal value are taken into account.

In another embodiment of the invention, a first sample is taken, and a confirmation window of a predefined length is defined, the deviation values for a predefined number of samples within the confirmation window, preferably for all samples within the confirmation window are determined, the determined deviations values are compared with a threshold, and stalling is detected if the number of determined deviation values exceeding the threshold is greater than a predefined amount, wherein the first sample defines the beginning of the confirmation window.

In other words, with the measurement of the first sample a confirmation window is set. The length of the confirmation window is defined as a number of samples, as a number of deviation values or as a duration. In the simplest case, all of the samples taken in the confirmation window are used, and the deviation values of consecutive samples are determined.

However, it is possible that the samples to be used are selected in a certain manner, e.g. every other sample. In that case, the deviation values of selected samples adjacent in time are calculated.

If the number of deviation values that exceeds the threshold is greater than a predefined amount, stalling is detected. This way, stalling can be detected reliably even if unexpected but irrelevant rises in the load of the stepper motor and therefore the voltage have occurred.

To further improve the method, it is not necessary to calculate the deviation values for all samples, if all of the deviation values in the beginning of the confirmation window already exceed the threshold so that the predefined amount of deviation values exceeding the threshold is reached before all deviation values are evaluated. This can also happen the other way around, i.e. enough deviation values at the beginning of the confirmation window do not exceed the threshold.

Preferably, the length of the confirmation window is given as the number of samples or as the number of deviation values within the confirmation window. This way, the quality of the method is independent of the selected sampling rate. The length of the confirmation window is, for example, five deviation values, thus six samples. The amount of the number of determined deviation values exceeding a threshold can be three. Thus, three out of five successive deviation values have to exceed the threshold in order to detect stalling of the electric motor.

For example, a moved confirmation window is defined, if the deviation value of the first sample and the following second sample does not exceed the threshold, wherein the second sample defines the beginning of the moved confirmation window, so that the detection speed of the method is increased.

In a preferred embodiment, the samples are consecutive, leading to a very precise and robust detection.

For instance, the deviation value is the difference of the voltages of the two samples. For example, the deviation value is equal to the voltage of the second sample minus the voltage of the first sample, and the threshold is an upper bound of the allowed range, so that rapidly rising voltages/loads of the stepper motor can be detected.

Preferably, the value of the threshold depends on the voltage of the earlier one of the two samples used for the deviation value, preferably the value of the threshold rises with the rising voltage of the earlier sample. I.e. for a deviation value in question, the threshold is a function of the voltage of the sample taken earlier of the two samples that were used to calculate said deviation value. Thus, a very reliable, precise and robust method can be provided.

In another embodiment of the invention, the first sample is taken a predefined time after the start of the control phase so that the rise and other transient conditions at the beginning of a control phase are neglected.

For example, the sampling rate is 500 µs, allowing for a quick response time.

The invention further provides an electric stepper motor with a control unit, wherein the control unit is configured such that it can perform the above mentioned method.

The objective is also accomplished by a heating, ventilation and/or air conditioning system, especially for a vehicle, with at least one flap to control an air stream and a stepper motor that is connected to the flap such that the stepper motor is able to move the flap, wherein the stepper motor comprises a control unit, wherein the control unit is configured such that it can perform the above mentioned method. With a stepper motor able to perform the above mentioned method, a very reliable HVAC system is realized because the end positions of the movement range of the flap can be determined reliably by the HVAC system.

Figure 2:
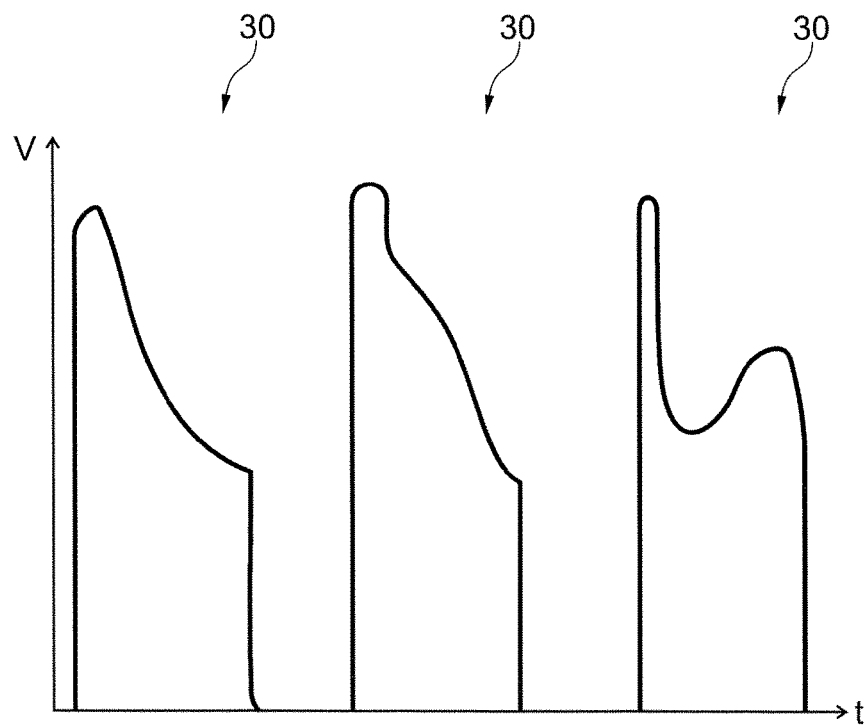
Figure 3:
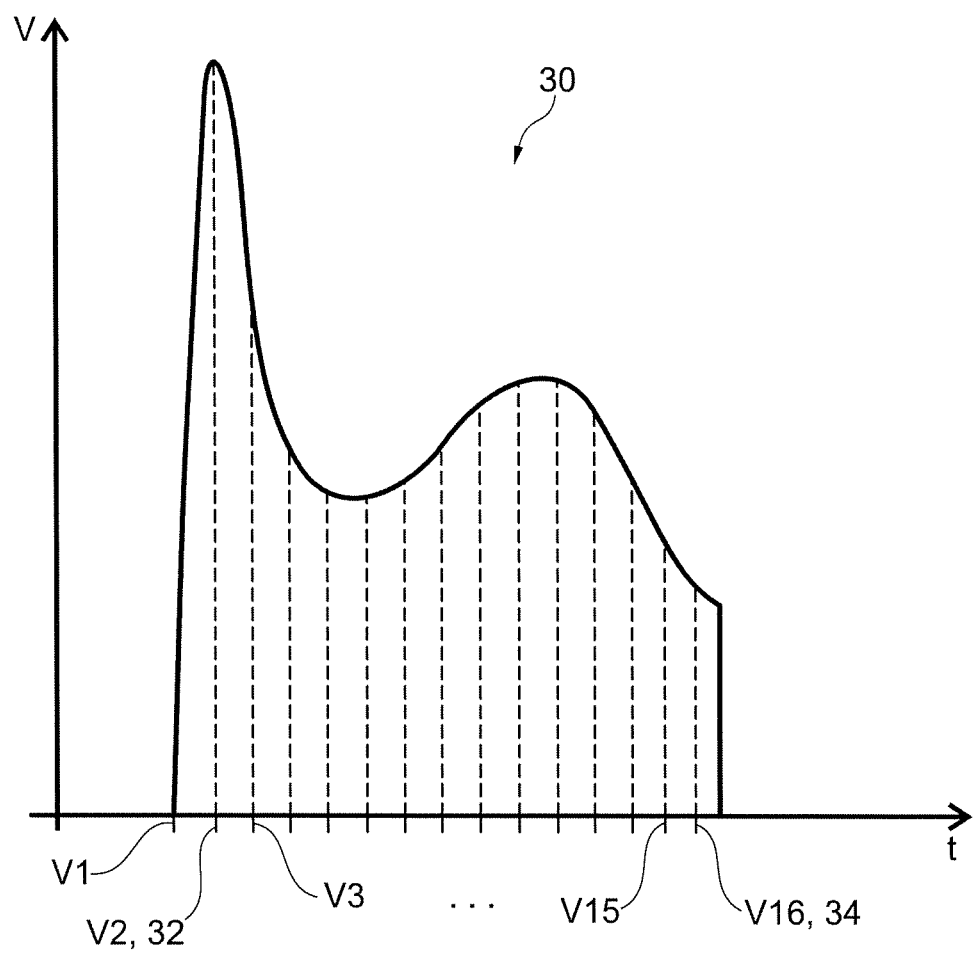
Figure 4:
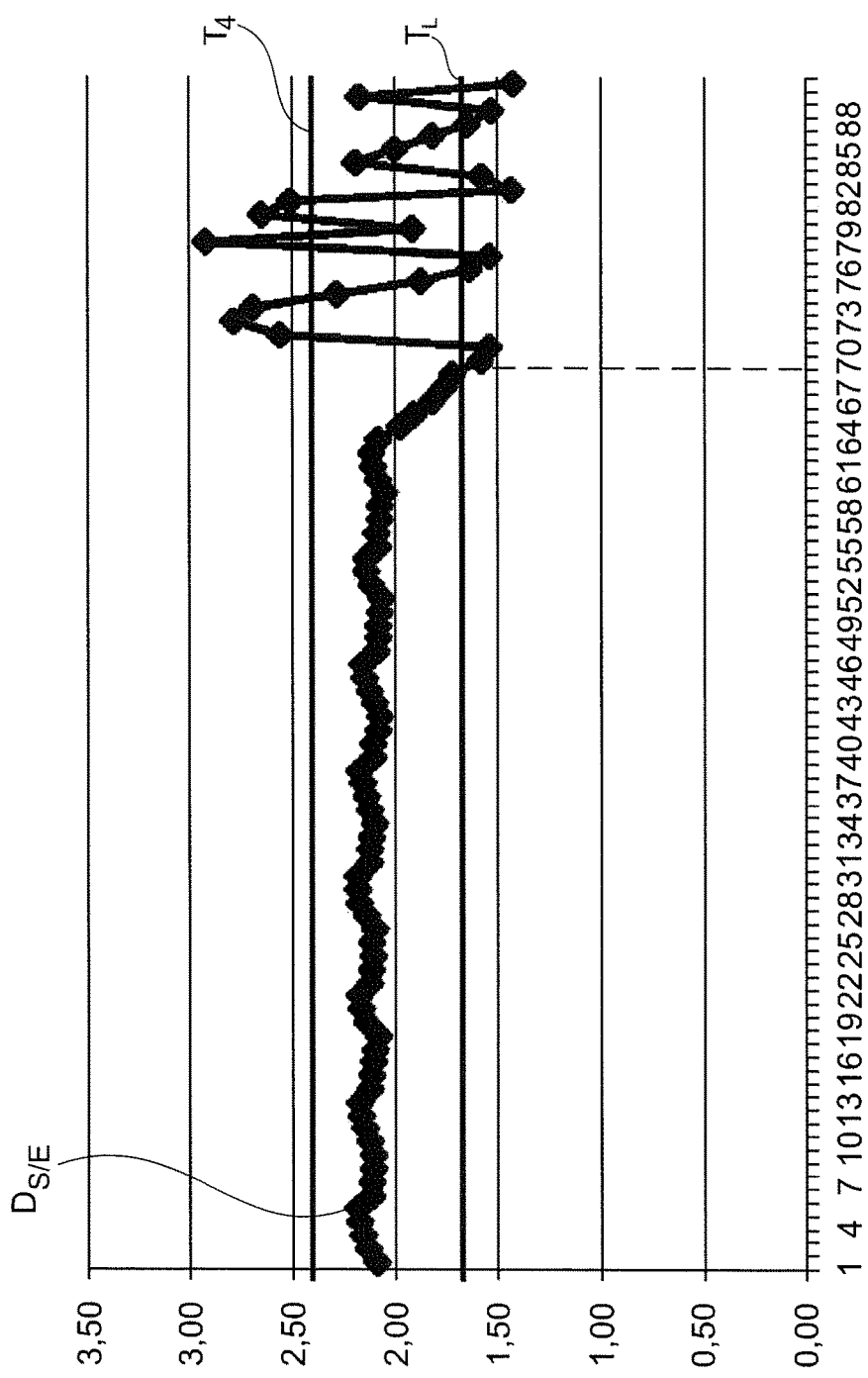
Figure 5:
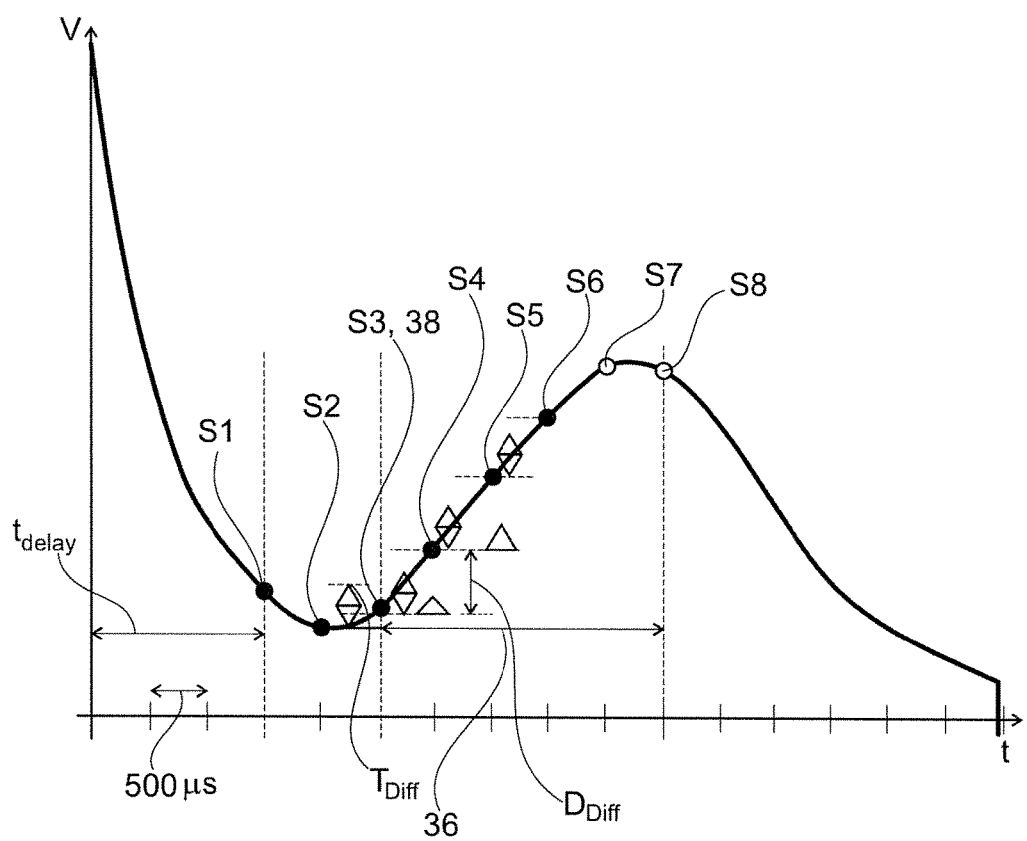

Further features and advantages of the invention will be apparent from the following description of the embodiments and the attached drawings to which reference is made and in which:

FIG. 1 shows schematically a part of a heating, ventilation and/or air conditioning system according to the invention, FIG. 2 shows a diagram depicting the voltage at one coil of the stepper motor over time for three different control phases, FIG. 3 shows a diagram showing the voltage over time for a single control phase that exhibits stalling, FIG. 4 shows a plot of the ratio of the voltage at the beginning of a control phase and at the end of the control phase for about 90 control phases, and FIG. 5 shows a diagram of the voltage over time for a control phase exhibiting stalling.

FIG. 1 shows part of a heating, ventilation and/or air conditioning system (HVAC system) 10 for a vehicle comprising a main air duct 12 that splits up into two distribution air ducts 14.

The distribution air ducts 14 lead into a passenger cabin of the vehicle at different locations.

A rotatable flap 16 is located within each of the distribution air ducts 14 to open or close the corresponding duct 14.

Each of the flaps 16 is connected with an electric stepper motor 18 that is able to create the necessary torque to rotate the flap 16.

In the shown embodiment, the flaps 16 are connected to their corresponding electric stepper motor 18 via drive shafts 20. However, other means for connecting the flap 16 with the electric stepper motor are possible as well, like guide rails.

The stepper motors 18 each comprise a rotor/stator assembly 22 with a plurality of coils (not shown) that provide the torque necessary to rotate the respective drive shaft 20 and flap 16.

Further, the electric stepper motors 18 comprise a control unit 24 that controls the rotor/stator assembly 22, especially by controlling the currents and voltages applied to the coils.

Both electric stepper motors 18, more precisely their control units 24, are electrically connected to a HVAC controller 26 that controls the HVAC system 10.

The HVAC controller 26 can control the air stream through the distribution air ducts 14 of the HVAC system 10 by opening or closing specific distribution air ducts 14. For this purpose, signals to the stepper motors 18 to rotate the corresponding flap 16 are issued from the HVAC controller 26 to the stepper motors 18.

For a precise control of the air stream, the control unit 24 or the HVAC controller 26 performs a calibration of the stepper motors 18 regularly. During calibration, the movement range of the flaps 16 is detected, meaning that the flaps 16 are moved from one of their end positions to the other end position. The end positions are identified by determining the position at which the electric stepper motor 18 starts to stall.

In order to detect stalling of the electric stepper motor 18 the control unit 24 measures the voltage at a coil of its stepper motor 18 continuously or in regular intervals.

A plot of the measured voltages over time during three control phases 30 is shown in FIG. 2. Each control phase 30 corresponds to one step of the stepper motor 18, i.e. during each control phase 30 the voltage at the coil is raised in order to rotate the rotor of the rotor/stator assembly 22 by one step.

During a normal step and if the flaps 16 can move freely, the voltage decreases continuously over one control phase 30 as can be seen in the first and second control phase 30 shown in FIG. 2.

The control phase 30 plotted on the right hand side of FIG. 2 depicts the situation if the flap 16 cannot move freely, for example if the flap reaches its end position. In this case, the stepper motor 18 is stalling and the voltage does not fall continuously but it rises before the control phase 30 ends.

This difference in shape is detected by the control unit 24 and can be used to detect stalling of the stepper motor 18 and to precisely determine the end positions of the stepper motor 18.

In the situation shown in FIG. 3, the voltage is measured in regular intervals, i.e. samples of the voltage are taken in regular intervals. In the shown situation, 16 samples V1-V16 are taken during one control phase 30. However, it is possible that a different amount of samples are taken during one control phase 30, for example 32 samples during one control phase 30.

The samples taken are numbered with respect to the control phase 30, in the situation of FIG. 3 the samples are labeled V1 to V16.

The control unit 24 determines a deviation value $D_{S/E}$ calculated as the ratio between the voltage of a sample taken at the beginning of the control phase 30, the start sample 32, and the voltage of a sample taken at the end of control phase 30, the end sample 34.

In the shown embodiment of FIG. 3, the start sample 32 corresponds to the second sample V2 taken in the control phase 30 and the end sample 34 corresponds to the last and thus $16^{th}$ sample V16 taken in the control phase 30. Therefore, the deviation value $D_{S/E}$ in this case calculates as V2/V16.

Then, the deviation value $D_{S/E}$ is compared by the control unit 24 to an upper threshold $T_U$ and a lower threshold $T_L$. If the deviation value $D_{S/E}$ lies between the upper threshold $T_U$ and the lower threshold $T_L$, i.e. the allowed range, the control unit 24 regards the deviation value $D_{S/E}$ as normal and concludes that the stepper motor 18 is not stalling.

If, however, the deviation value $D_{S/E}$ exceeds one of the thresholds $T_U$ or $T_L$, i.e. is above the upper threshold $T_U$ or below the lower threshold $T_L$, the control unit 24 regards the stepper motor 18 as stalled.

In the diagram shown in FIG. 4, the deviation values $D_{S/E}$ are shown for about 90 control phases 30. Further, the upper threshold $T_U$ and the lower threshold $T_L$ are indicated by solid lines.

In the shown case, the upper threshold $T_U$ is set to 2.4 and the lower threshold $T_L$ is set to 1.7.

In FIG. 4, the stepper motor 18 runs normally for about 60 control phases 30. Then, the deviation value $D_{S/E}$ falls until it exceeds the lower threshold $T_L$ at the 70th control phase 30. At this point, the stepper motor 18 has stalled and the deviation values $D_{S/E}$ of the following control phases 30 are highly irregular and mostly outside the allowed range.

Thus, after the 70th control phase 30 the control unit 24 detects that the stepper motor 18 has stalled and it is thus able to precisely determine the end position of the stepper motor 18.

The control unit 24 can stop the calibration process after the 70th control phase 30. The following deviation values $D_{S/E}$ are only shown for illustrative purposes.

However, the control unit 24 does not rely solely on the deviation value $D_{S/E}$ of the start sample 32 and the end sample 34, i.e. a first criterion, but uses also a second criterion that will be explained below with respect to FIG. 5.

FIG. 5 shows the course of the voltage for a part of a control phase 30. The control unit 24 takes samples of the voltage in regular intervals as has explained above. However, samples taken within a predefined time interval $t_{delay}$ after the beginning of a control phase 30 are neglected. The sampling rate is for example 500 µs.

For the second criteria, a deviation value $D_{Diff}$ is determined for consecutive samples. For example, the deviation value $D_{Diff}$ is calculated as the difference of the voltages of two consecutive samples, preferably as the voltage of the latter sample minus the voltage of the earlier sample.

Further, a confirmation window 36 of a predefined length beginning with a first sample 38 is set. In the case shown in FIG. 5, the confirmation window 36 has the length of five deviation values $D_{Diff}$, i.e. six samples. The length of the confirmation window 36 can also be defined as a period of time.

The confirmation window 36 is a moving window meaning that each sample can be the first sample 38 of the confirmation window 36, if certain conditions are met.

Stalling is detected if a predefined amount of deviation values $D_{off}$ (three in the case shown) out of the deviation values $D_{off}$ within the confirmation window 36 exceed a threshold $T_{Diff}$.

In the shown case, the threshold $T_{Diff}$ is an upper bound and the threshold $T_{Diff}$ is illustrated in FIG. 5 as the diamond shaped error bars.

If the deviation value $D_{Diff}$ is smaller than the threshold $T_{Diff}$, i.e. if the voltage of the latter sample is below the voltage of the earlier sample or within the range illustrated by the diamond shaped error bars, the latter sample is within the allowed range and it is regarded as normal.

If, however, the deviation value $D_{Diff}$ lies above the threshold $T_{Diff}$, i.e. if the voltage of the latter sample lies higher and above the diamond shaped error bar of the earlier sample, the latter sample is regarded as irregular.

In this case, the confirmation window 36 is moved and the irregular sample becomes the first sample 38 of the moved confirmation window 36.

In FIG. 5, the earliest sample S1 is the initial sample regarded after the time interval $t_{delay}$ after the beginning of the control phase 30 has lapsed.

The next sample S2 is regarded as a normal sample because the voltage of sample S2 lies below the voltage of sample S1.

Regarding the next sample S3, even though the voltage of sample S3 is higher than the voltage of sample S2, the deviation value $D_{Diff}$ of sample S2 and sample S3 lies below the threshold $T_{Diff}$, thus sample S3 is regarded as normal.

This can be seen graphically in FIG. 5 because sample S3 lies within the diamond shaped error bar of sample S2.

However, the deviation value of the sample S3 and the next sample S4 lies above the threshold $T_{Diff}$, thus it exceeds the threshold $T_{Diff}$. This can be seen in FIG. 5 as sample S3 does not lie within the diamond shaped error bar of sample S3. Therefore, the deviation value $D_{Diff}$ of the samples S3 and S4 is regarded as irregular and the confirmation window 36 is moved so that sample S3 becomes the first sample 38 of the confirmation window 36.

In the next step, the following four deviation values $D_{Diff}$ of the first sample 38, sample S3 in this case, and the following five samples S4-S8 are determined and it is evaluated if any of these deviation values $D_{Diff}$ exceeds the threshold $T_{Diff}$.

In FIG. 5, the deviation values $D_{Diff}$ of the samples S4 and S5, S5 and S6, S6 and S7, as well as S7 and S8 lie within the confirmation window 36 and are evaluated in chronological order.

Both deviation values $D_{Diff}$ of the samples S4 and S5 and of the samples S5 and S6 exceed the threshold $T_{Diff}$. This can be seen graphically, because the samples S5 and S6 lie outside of the diamond shaped error bars of the samples S4 and S5, respectively.

Thus, the first three deviation values $D_{Diff}$ of the five deviation values $D_{Diff}$ of the confirmation window 36 exceed the threshold $T_{Diff}$. Therefore, the control unit 24 senses that the stepper motor 18 has stalled.

As seen in the example of FIG. 5, it is not necessary that all the deviation values $D_{Diff}$ in the confirmation window 36 are actually calculated, because stalling can already be determined as soon as three deviation values $D_{Diff}$ within the same confirmation window 36 exceed the threshold $T_{Diff}$.

The same concept applies if sufficient deviation values $D_{Diff}$, three in the shown case, lie within the allowed range. In this case, the necessary amount of deviation values $D_{Diff}$ to exceed the predefined amount cannot be reached. Thus, the control unit 24 can regard the stepper motor as not stalled even though it has not evaluated all deviation values $D_{Diff}$ of the confirmation window 36.

In this case, the confirmation window 36 is moved and the last evaluated sample of the confirmation window 36 becomes the first sample 38 of the moved confirmation window 36.

In the case shown in FIG. 5, all samples that have been taken and therefore all deviation values $D_{Diff}$ are used for the evaluation.

However, it is also possible that more samples are taken than the number of samples actually used. For example, it is possible that only the deviation values between every other sample is evaluated and used to detect stalling. In any case, the deviation values $D_{Diff}$ are calculated on the basis of two samples that are adjacent in time.

In other words, out of the samples picked for the evaluation, regardless if every sample, every other sample, etc. is picked, deviation values $D_{Diff}$ are only calculated for samples that are consecutive in time.

It is also possible that the value of the threshold $T_{Diff}$ depends on the voltage of the sample taken earlier of the two samples. For example, the threshold for the deviation value $D_{Diff}$ of the samples S3 and S4 may be smaller than the threshold value $T_{Diff}$ for the deviation value $D_{Diff}$ between the samples S4 and S5, because the voltage of sample S3 is lower than the voltage of sample S4.

This case has been illustrated in FIG. 5 by two triangular error bars for the samples S3 and S4.

In the shown electric stepper motors 18 with control units 24 and in the HVAC system 10, both criteria are used simultaneously, meaning that if either one of the criteria is met, i.e. if a stalling stepper motor 18 is detected either way, the control unit 24 regards the stepper motor 18 as stalled.

However, it is also possible that only one of the criteria is applied or that both criteria have to be fulfilled, before the stepper motor 18 is regarded as stalled.

The invention claimed is:

1. A method for detecting stalling of an electric stepper motor, comprising:
   continuously or periodically obtaining a plurality of samples of a voltage at a coil of the stepper motor;
   determining a deviation value corresponding to a deviation between measured voltages of two of the plurality of obtained samples; and
   determining, using the deviation value whether the electric motor is stalling,
   wherein:
      each sample of the plurality of samples is an individual raw voltage value obtained from the coil of the stepper motor at a predefined time, and
      a start sample of the plurality of samples is a sample obtained after a start of a control phase and after a predetermined time interval has lapsed.

2. The method according to claim 1, wherein:
the start sample is taken at the beginning of the control phase, which corresponds to one step of the stepper motor,
an end sample is taken at the end of the control phase, and
the deviation value is determined using the start sample and the end sample.

3. The method according to claim 2, wherein the deviation value is a ratio between a voltage of the start sample and a voltage of the end sample.

4. The method according to claim 2, wherein the deviation value is compared to at least one threshold and if the deviation value exceeds the threshold or one of the thresholds, stalling of the stepper motor is detected.

5. The method according to claim 4, wherein stalling is detected if the deviation value is smaller than a lower threshold or larger than an upper threshold.

6. A method for detecting stalling of an electric stepper motor comprising:
   continuously or periodically obtaining a plurality of samples of a voltage at a coil of the stepper motor;
   determining a deviation value corresponding to a deviation between measured voltages of two of the plurality of obtained samples;
   determining, using the deviation value whether the electric motor is stalling;
   obtaining a first sample and defining a confirmation window of a predefined length;
   determining the deviation values for all samples within the confirmation window;
   comparing the determined deviations values with a threshold; and
   detecting stalling when the number of determined deviation values exceeding the threshold is greater than a predefined amount,
   wherein the first sample defines a beginning of the confirmation window.

7. The method according to claim 6, wherein the length of the confirmation window is given as the number of samples or as the number of deviation values within the confirmation window.

8. The method according to claim 6, wherein a moved confirmation window is defined, if the deviation value of the first sample and the following second sample does not exceed the threshold, wherein the second sample defines the beginning of the moved confirmation window.

9. The method according to claim 6, wherein the samples are consecutive.

10. The method according to claim 6, wherein the deviation value is the difference of the voltages of the two samples.

11. The method according to claim 6, wherein the value of the threshold depends on the voltage of the earlier one of the two samples used for the deviation value, wherein the value of the threshold rises with the rising voltage of the earlier sample.

12. The method according to claim 6, wherein the first sample is taken a predefined time after the start of the control phase.

13. The method according to claim 1, wherein the sampling rate is 500 μs.

14. An electric stepper motor comprising a control unit configured to perform the method according to claim 1.

15. A heating, ventilation and/or air conditioning system for a vehicle, comprising:
   at least one flap to control an air stream; and
   a stepper motor connected to the flap such that the stepper motor is configured to move the flap,
   wherein the stepper motor comprises a control unit configured to perform the method according to claim 1.

* * * * *